US011928257B2

(12) United States Patent
Choi et al.

(10) Patent No.: US 11,928,257 B2
(45) Date of Patent: Mar. 12, 2024

(54) METHOD AND ELECTRONIC DEVICE FOR TRACKING EYE

(71) Applicant: Samsung Electronics Co., Ltd., Suwon-si (KR)

(72) Inventors: Dongok Choi, Suwon-si (KR); Hyoungil Song, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 87 days.

(21) Appl. No.: 17/689,423

(22) Filed: Mar. 8, 2022

(65) Prior Publication Data

US 2022/0261076 A1    Aug. 18, 2022

Related U.S. Application Data

(63) Continuation of application No. PCT/KR2022/001779, filed on Feb. 4, 2022.

(30) Foreign Application Priority Data

Feb. 17, 2021   (KR) .................. 10-2021-0021027

(51) Int. Cl.
    *G06F 3/01*    (2006.01)
    *G02B 27/01*   (2006.01)
    *H04N 23/56*   (2023.01)

(52) U.S. Cl.
    CPC .......... *G06F 3/013* (2013.01); *G02B 27/0172* (2013.01); *G02B 27/0179* (2013.01);
    (Continued)

(58) Field of Classification Search
    CPC .. G06F 3/013; G02B 27/0172; G02B 27/0179; G02B 2027/0132;
    (Continued)

(56) References Cited

U.S. PATENT DOCUMENTS 10,268,268 B1 *  4/2019  Trail .................... H04N 23/56
10,627,627 B2    4/2020  Martinez et al.
(Continued)

FOREIGN PATENT DOCUMENTS

CN      108681400 A    10/2018
JP      2017/135605 A   8/2017
(Continued)

OTHER PUBLICATIONS

International Search Report and written opinion dated May 3, 2022, in International Application No. PCT/KR2022/001779.

*Primary Examiner* — Amy Onyekaba
(74) *Attorney, Agent, or Firm* — Jefferson IP Law, LLP

(57) ABSTRACT

An electronic device is provided. The electronic device includes a light source module, a display module including at least one layer, a camera module, and a processor operatively connected to the light source module, the display module, and the camera module. The processor may emit light through the light source module along a waveguide formed in the at least one layer of the display module, may use the camera module to detect, based on at least one pattern structure formed in the waveguide, at least a part of the light, which has been reflected from a user's eyeball, and may track the movement of the user's eyeball, based on the detected light.

18 Claims, 13 Drawing Sheets

(52) U.S. Cl.
CPC ..... H04N 23/56 (2023.01); *G02B 2027/0132* (2013.01); *G02B 2027/0138* (2013.01); *G02B 2027/014* (2013.01); *G02B 2027/0178* (2013.01); *G02B 2027/0187* (2013.01)

(58) Field of Classification Search
CPC ...... G02B 2027/0138; G02B 2027/014; G02B 2027/0178; G02B 2027/0187; G02B 27/0093; H04N 23/56
See application file for complete search history.

(56) References Cited

U.S. PATENT DOCUMENTS

| | | | | |
|---|---|---|---|---|
| 10,990,172 | B2* | 4/2021 | Kim | G06F 3/013 |
| 11,073,903 | B1* | 7/2021 | Ouderkirk | G02B 27/0093 |
| 11,112,865 | B1* | 9/2021 | Fix | G06F 3/017 |
| 11,327,561 | B1* | 5/2022 | Saito | G02B 27/288 |
| 11,455,031 | B1* | 9/2022 | Sharma | G06F 3/013 |
| 11,520,152 | B1* | 12/2022 | Lau | G02B 6/102 |
| 2013/0077049 | A1 | 3/2013 | Bohn | |
| 2014/0062868 | A1* | 3/2014 | Blixt | G06V 40/19 345/156 |
| 2015/0138451 | A1 | 5/2015 | Amitai | |
| 2015/0182759 | A1 | 7/2015 | Baek et al. | |
| 2017/0365101 | A1* | 12/2017 | Samec | G02B 27/0172 |
| 2018/0046859 | A1 | 2/2018 | Jarvenpaa | |
| 2018/0275394 | A1* | 9/2018 | Yeoh | G02B 6/005 |
| 2018/0356638 | A1 | 12/2018 | Yang et al. | |
| 2019/0041634 | A1* | 2/2019 | Popovich | G02B 6/00 |
| 2019/0056600 | A1* | 2/2019 | Danziger | A61B 3/12 |
| 2019/0113752 | A1* | 4/2019 | Kaehler | G02B 27/0176 |
| 2019/0302882 | A1* | 10/2019 | Blixt | G06F 3/01 |
| 2019/0324276 | A1* | 10/2019 | Edwin | G02B 27/0093 |
| 2020/0033590 | A1* | 1/2020 | Katsuyama | G02B 27/0093 |
| 2020/0159317 | A1* | 5/2020 | Kim | G02B 6/005 |
| 2020/0170504 | A1 | 6/2020 | Dykaar | |
| 2020/0201051 | A1 | 6/2020 | Popovich et al. | |
| 2020/0241308 | A1 | 7/2020 | Danziger et al. | |
| 2021/0033867 | A1 | 2/2021 | Luo et al. | |
| 2021/0203910 | A1* | 7/2021 | Gao | H04N 13/254 |
| 2022/0201264 | A1* | 6/2022 | Kirillov | G06V 40/193 |

FOREIGN PATENT DOCUMENTS

| | | |
|---|---|---|
| JP | 2020/013132 A | 1/2020 |
| KR | 10-2015-0013815 A | 2/2015 |
| KR | 10-2015-0078092 A | 7/2015 |
| KR | 10-2018-0135646 A | 12/2018 |
| KR | 10-2020-0102102 A | 8/2020 |
| WO | 2013/049012 A1 | 4/2013 |
| WO | 2021/016045 A1 | 1/2021 |

* cited by examiner

METHOD AND ELECTRONIC DEVICE FOR TRACKING EYE

CROSS-REFERENCE TO RELATED APPLICATION(S)

This application is a continuation application, claiming priority under § 365(c), of an International application No. PCT/KR2022/001779, filed on Feb. 4, 2022, which is based on and claims the benefit of a Korean patent application number 10-2021-0021027, filed on Feb. 17, 2021, in the Korean Intellectual Property Office, the disclosure of which is incorporated by reference herein in its entirety.

TECHNICAL FIELD

The disclosure relates to a method and an electronic device for tracking a gaze.

BACKGROUND ART

In line with development of digital technologies, there has been widespread use of various types of electronic devices, such as a mobile communication terminal, a personal digital assistant (PDA), an electronic wallet, a smartphone, a tablet personal computer (PC), or a wearable device. The hardware-related part and/or software-related part of such electronic devices have been continuously improved to support and enhance functions of the electronic devices.

For example, an electronic device may provide virtual reality (VR) such that a user can have realistic experiences in a computer-generated virtual world. In addition, an electronic device may provide augmented reality (AR) which shows virtual information (or object) added to the actual world, or mixed reality (MR) which is a combination of VR and AR. An electronic device may include a head up display for providing such VR or AR.

An electronic device such as a head up display may be worn on the user's head part, and may include a display module for providing the user with VR. The electronic device may have a display module included in a frame (for example, housing), and the display module may include at least one layer. In connection with displaying a virtual world through the display module, the electronic device may track the user's eye movement and may control the display module such that the virtual world is displayed based on the user's gaze. The electronic device may track the user's gaze by using infrared rays emitted from the light source module.

The above information is presented as background information only to assist with an understanding of the disclosure. No determination has been made, and no assertion is made, as to whether any of the above might be applicable as prior art with regard to the disclosure

DISCLOSURE

Technical Problem

An electronic device may have an additional element disposed near a light source module and configured to reflect infrared rays such that infrared rays emitted from the light source module are directed to the user's eyes. The element disposed near the light source module may make the structure of the electronic device complicated and may increase the size thereof.

Aspects of the disclosure are to address at least the above-mentioned problems and/or disadvantages and to provide at least the advantages described below. Accordingly, an aspect of the disclosure is to provide a method capable of reflecting infrared rays emitted from a light source module, based on a waveguide tube formed inside a display module, towards the user's eyes, thereby tracking the user's gaze, and an electronic device for implementing the same.

Additional aspects will be set forth in part in the description which follows and, in part, will be apparent from the description, or may be learned by practice of the presented embodiments.

Technical Solution

In accordance with an aspect of the disclosure, an electronic device is provided. The electric device includes a light source module, a display module including at least one layer, a camera module, and a processor operatively connected to the light source module, the display module, and the camera module, wherein the processor is configured to emit light through the light source module along a waveguide tube formed in the at least one layer of the display module, use the camera module to detect, based on at least one pattern structure formed in the waveguide tube, at least a part of the light, which has been reflected from a user's eyeball, and track movement of the user's eyeball, based on the detected light.

In accordance with another aspect of the disclosure, a method for tracking a gaze by an electronic device is provided. The method includes controlling a light source module such that light is emitted through the light source module along a waveguide tube formed in at least one layer included in a display module, using a camera module to detect, based on at least one pattern structure formed in the waveguide tube, at least a part of the emitted light, which has been reflected from a user's eyeball, and tracking movement of the user's eyeball, based on the detected light.

Advantageous Effects

According to various embodiments of the disclosure, light (for example, infrared rays) may be used to track the user's gaze, and an electronic device may be designed to have a waveguide tube (for example, infrared ray (IR) waveguide tube) at least partially included in a display module and configured to reflect the light.

An electronic device according to an embodiment may have a waveguide tube formed in a remaining region other than a region of a display module in which at least one object related to an augmented reality (AR) service is displayed, light for tracking the user's gaze may be emitted along the waveguide tube, and reflected light of the light may be used to track the user's gaze.

An electronic device according to an embodiment may have a waveguide tube (for example, an infrared (IR) waveguide tube) implemented in a remaining region other than a region in which an object related to an AR service is displayed such that the electronic device has a simplified structure and a reduced size. Various other advantageous effects identified explicitly or implicitly through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
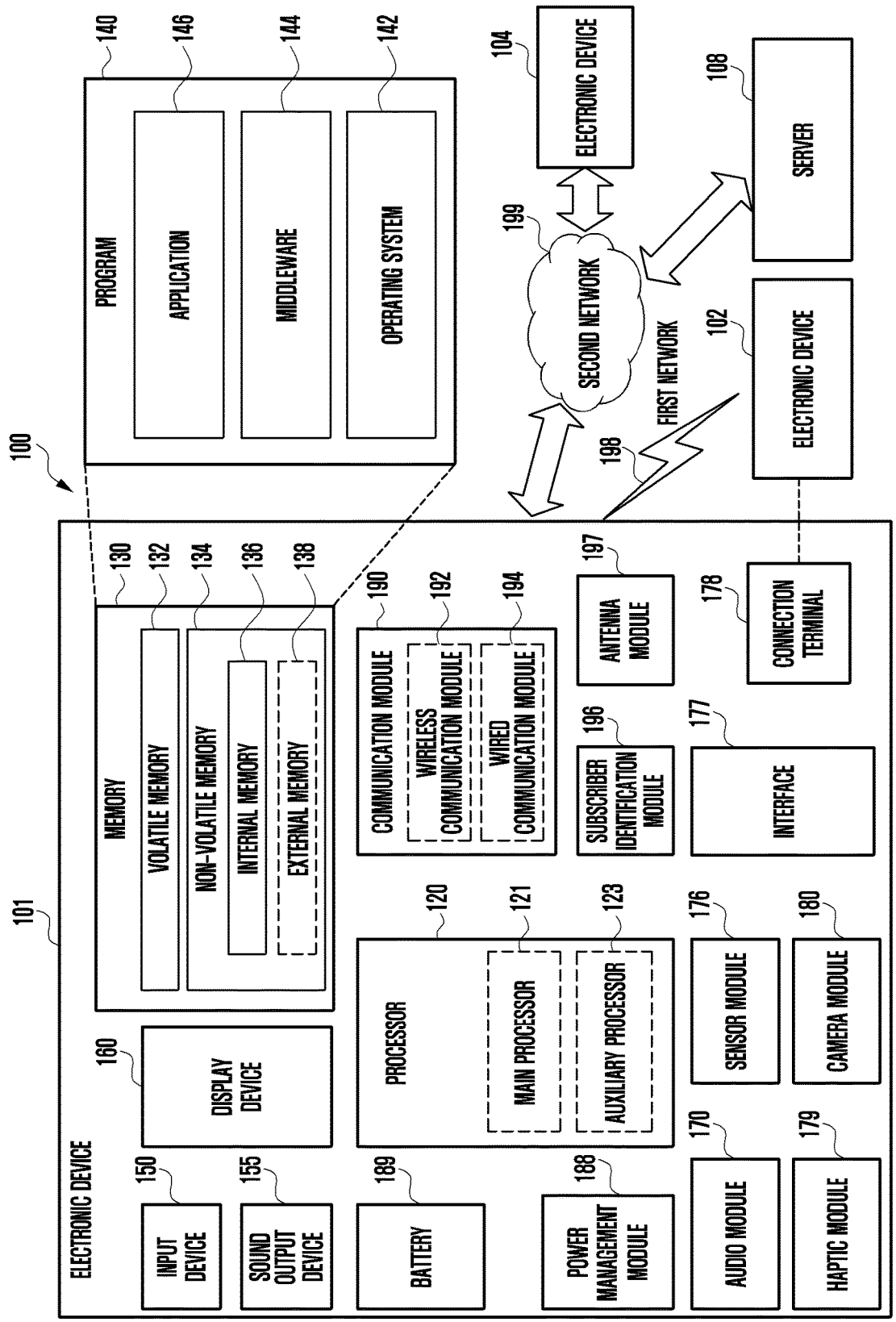
FIG. 1 is a block diagram illustrating an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of electronic device 104 or a server 108 via a second network 199 (e.g., a long-range wireless communication network). The electronic device 101 may communicate with the electronic device 104 via the server 108. The electronic device 101 includes a processor 120, memory 130, an input module (or input device) 150, an audio output module (or sound output device) 155, a display module (or display device) 160, an audio module 170, a sensor module 176, an interface 177, a connecting terminal (or connection terminal) 178, a haptic module 179, a camera module 180, a power management module 188, a battery 189, a communication module 190, a subscriber identity module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes. According to an embodiment, the camera module 180 may include a front camera disposed on the front surface of the electronic device 101 and a rear camera disposed on the rear surface of the electronic device 101.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or a standard of the Infrared Data Association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
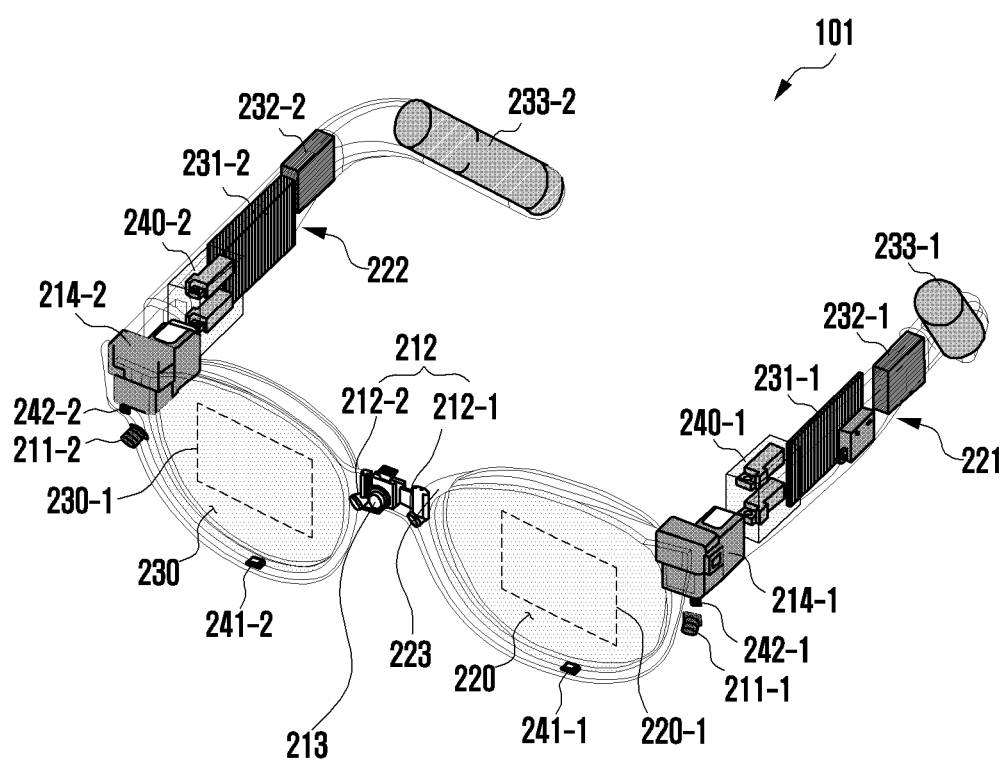
FIG. 2 illustrates the entire configuration of an electronic device including multiple cameras according to an embodiment of the disclosure.

FIG. 2 illustrates the overall configuration of an electronic device (e.g., electronic device 101 in FIG. 1, wearable device, wearable glasses) including a plurality of cameras according to an embodiment of the disclosure.

Referring to FIG. 2, in various embodiments, the electronic device 101 may be an electronic device 101 which is manufactured to provide an image related to an augmented reality service to a user while being worn on a user's head. For example, the electronic device 101 may be formed in the shape of at least one among glasses, goggles, a helmet, or a hat, but is not limited thereto.

According to an embodiment, the electronic device 101 may provide an augmented reality (AR)-related image output such that at least one virtual object is shown while being overlapped, based on a region determined as the field of view (FoV) of the user. For example, the region determined as the field of view of the user is a region that the user wearing the electronic device 101 is determined to be able to recognize through the electronic device 101, and may include the entirety or at least a part of a display module (e.g., the display module 160 in FIG. 1) of the electronic device 101. According to an embodiment, the electronic device 101 may include multiple transparent members (e.g., the first transparent member 220 and/or the second transparent member 230) which correspond to both eyes (e.g., the left eye and/or the right eye) of the user, respectively. The multiple transparent members may include at least a part of a display module (e.g., the display module 160 in FIG. 1). For example, a first display module may be included in the first transparent member 220 corresponding to the left eye of the user, and a second display module may be included in the second transparent member 230 corresponding to the right eye of the user. The first display module and the second display module may be formed to be substantially identical to each other, and may be included in the display module 160.

Referring to FIG. 2, the electronic device 101 may include at least one transparent member (e.g., the first transparent member 220 or the second transparent member 230), at least one display module (e.g., the first display module 214-1 or the second display module 214-2), a camera module (e.g., the camera module 180 in FIG. 1), an audio module (e.g., the audio module 170 in FIG. 1), a first support part 221, and/or a second support part 222. According to an embodiment, the camera module 180 may include an image-capturing camera 213 for capturing an image corresponding to the field of view (FoV) of the user and/or measuring the distance from an object, an eye tracking camera 212 for determining the direction in which the user's eye looks, and/or recognition cameras (gesture cameras) 211-1 and 211-2 for recognizing a predetermined space. According to an embodiment, the first support part 221 and/or the second support part 222 may at least partially include printed circuit boards (PCBs) 231-1 and 231-2, speakers 232-1 and 232-2, and/or batteries 233-1 and 233-2.

Referring to FIG. 2, the electronic device 101 may include a body part 223, support parts (e.g., a first support part 221 and/or a second support part 222), and/or hinge parts (e.g., a first hinge part 240-1 and a second hinge part 240-2). The body part 223 and the support parts 221 and 222 may be operatively connected to each other through the hinge parts 240-1 and 240-2. The body part 223 may include the first transparent member 220, the second transparent member 230, and/or at least one camera (e.g., the recognition cameras 211-1 and 211-2, the eye tracking camera 212, or the image-capturing camera 213). The body part 223 may be at least partially placed on the user's nose, and may at least partially include the display module 160 and a camera module (e.g., the camera module 180 in FIG. 1). The support parts 221 and 222 may include support members capable of being put on the user's ears, and may include the first support part 221 to be put on the left ear and/or the second support part 222 to be put on the right ear. According to an embodiment, the first support part 221 or the second support part 222 may at least partially include battery 233-1 or 233-2 (e.g., the battery 189 in FIG. 1). The batteries 233-1 and 233-2 may be electrically connected to a power management module (e.g., the power management module 188 in FIG. 1).

According to an embodiment, the first hinge part 240-1 may connect the first support part 221 to the body part 223 such that the first support part 221 can rotate with respective to the body part 223. The second hinge part 240-2 may connect the second support part 222 to the body part 223 such that the second support part 222 can rotate with respect to the body part 223. According to another embodiment, the hinge parts 240-1 and 240-2 of the electronic device 101 may be omitted. For example, the body part 223 may be directly connected to the support parts 221 and 222.

In the electronic device 101 illustrated in FIG. 2, light generated in display modules 214-1 and 214-2 may be projected on transparent members (e.g., the first transparent member 220, the second transparent member 230) to display information. For example, light generated in the first display module 214-1 may be projected on the first transparent member 220, and light generated in the second display module 214-2 may be projected on the second transparent member 230. When light capable of displaying virtual objects is projected on the transparent members 220 and 230 which are at least partially formed of a transparent material, the user may recognize reality over which the virtual objects are superposed. In this case, it may be understood that the display module 160 described in FIG. 1 includes the display modules 214-1 and 214-2 and the transparent members 220 and 230 of the electronic device 101 illustrated in FIG. 2. However, the electronic device 101 described in the disclosure is not limited to displaying information through the above-described method. A display module, which may be included in the electronic device 101, may be replaced with a display module including various types of information displaying methods. For example, when a display panel including a light-emitting element formed of a transparent material is embedded in each of the transparent members 220 and 230, it is possible to display information without any separate display module (e.g., the first display module 214-1 or the second display module 214-2). In this case, the display module 160 described in FIG. 1 may imply the transparent members 220 and 230 and the display panel included in each of the transparent members 220 and 230.

According to an embodiment, virtual objects output through the display modules 214-1 and 214-2 may include information related to an application program executed in the electronic device 101 and/or information related to an external object that is positioned in a real space recognized by the user through the transparent members 220 and 230. The external object may include things existing in the real space. Hereinafter, the real space recognized by the user through the transparent members 220 and 230 is called a field-of-view (FoV) region of the user. For example, the electronic device 101 may identify an external object included in at least a part of a region, which is determined to be the user's FoV, in image information related to a real space, acquired through a camera module (e.g., the image-capturing camera module 213) of the electronic device 101. The electronic device 101 may output a virtual object related to the identified external object through the display modules 214-1 and 214-2.

According to an embodiment, the display module 160 may include the first transparent member 220 and the second transparent member 230, and may provide visual information to the user through the first transparent member 220 and the second transparent member 230. The electronic device 101 may include the first transparent member 220 corresponding to the left eye and/or the second transparent member 230 corresponding to the right eye. According to an embodiment, the display module 160 may include a display panel, a protective panel (e.g., a protective layer), and/or a lens. For example, the display panel may contain a transparent material such as glass or plastic.

According to an embodiment, each of the transparent members (e.g., the first transparent member 220 and the second transparent member 230) may include a condenser lens (not shown) and/or a waveguide tube (not shown) (e.g., a waveguide tube for displaying a virtual object (e.g., a red, green, blue (RGB) waveguide tube), and/or a waveguide tube for transferring an infrared (IR) ray (e.g., an IR waveguide tube)), and may include a display region (e.g., a display region 220-1 and/or a display region 230-1) in which a virtual object is displayed. For example, the display region 220-1 may be at least partially positioned in the first transparent member 220 and the display region 230-1 may be at least partially positioned in the second transparent member 230. According to an embodiment, light emitted from the display modules 214-1 and 214-2 may be incident on one-side surfaces of the display regions 220-1 and 230-1 included in the transparent members 220 and 230. The light incident onto one-side surfaces of the display regions 220-1 and 230-1 included in the transparent members 220 and 230 may be transferred to the user through the waveguide tubes (not shown) positioned in the display regions 220-1 and 230-1. For example, each of the waveguide tubes included in the display regions 220-1 and 230-1 may be manufactured using glass, plastic, or a polymer, and may include a nanopattern formed on one surface of the inside or outside thereof. For example, the nanopattern may include a polygonal or curved grating structure. According to an embodiment, the light incident on the one-side surfaces of each of the display regions 220-1 and 230-1 included in the transparent members 220 and 230 may be propagated or reflected inside the waveguide tubes by the nanopatterns and transferred to the user. According to an embodiment, each of the waveguide tubes included in the display regions 220-1 and 230-1 may include at least one among at least one diffractive element (e.g., a diffractive optical element (DOE) or a holographic optical element (HOE)) or at least one reflective element (e.g., a reflective mirror). According to an embodiment, the waveguide tubes included in the display regions 220-1 and 230-1 may use the at least one diffractive element or reflective element to guide, to the user's eyes, light emitted from the display modules 214-1 and 214-2.

According to an embodiment, the first transparent member 220 and/or the second transparent member 230 included in the display module 160 may be divided into a first display region and a second display region. For example, the first display region may be defined as a region in which an augmented reality service is provided to the user, and may include the display regions 220-1 and 230-1. The second display region may be included in at least one transparent member 220 and 230, and may be defined as the remaining region other than the first display region (e.g., the display regions 220-1 and 230-1). According to an embodiment, the user may view, based on the first display regions and the second display regions, virtual objects and real objects generated by the augmented reality service.

According to an embodiment, the waveguide tubes may be classified into a waveguide tube for displaying, based on the first display region, a virtual object according to an augmented reality service (e.g., an RGB waveguide tube) and a waveguide tube for transferring IR light (e.g., an infrared ray), based on the second display region (e.g., an IR waveguide tube). According to an embodiment, the electronic device 101 may provide a virtual object to the user through a waveguide tube disposed in the first display region. For example, the first display region may be a region in which a virtual object is displayed. According to an embodiment, the electronic device 101 may track the user's gaze through a waveguide tube disposed in the second display region. For example, the second display region is a region in which a virtual object is not displayed, and may display a real object.

According to an embodiment, the first display region (e.g., the display regions 220-1 and 230-1) may be a region in which at least one object related to an augmented reality service is displayed based on light emitted through a waveguide tube (e.g., the RGB waveguide tube) positioned in at least a part of each of the transparent members 220 and 230.

According to an embodiment, even when light generated from a light source module (e.g., a light source module 310 in FIG. 3) is reflected by a pattern formed in the waveguide tube (e.g., an IR waveguide tube or the waveguide tube 320 in FIG. 3) positioned in the second display region and reflected by the user's eye, the user may not substantially sense the emitted light. Light (e.g., an infrared ray, IR light) emitted from the light source module 310 may be transferred to the user's eye, based on the waveguide tube (e.g., the waveguide tube 320 in FIG. 3) disposed in the second display region, and thus the user may not sense a situation in which the light is transferred. According to an embodiment, the electronic device 101 may sense the movement of the user's eye (e.g., a gaze), based on the light transferred to the user's eye.

According to another embodiment, the first transparent member 220 and/or the second transparent member 230 may be formed as transparent elements, and the user may recognize a real space of the rear surface through the first transparent member 220 and/or the second transparent member 230. The first transparent member 220 and/or the second transparent member 230 may display a virtual object in at least a partial region (e.g., the display regions 220-1 and 230-1) of a transparent element such that the virtual object is shown, to the user, to be superposed over at least a part of the real space. The first transparent member 220 and/or the second transparent member 230 may include multiple panels corresponding to both eyes (e.g., the left eye and/or the right eye) of the user, respectively. According to another embodiment, when the first transparent member 220 and/or the second transparent member 230 is a transparent ultra light-emitting diode (uLED), the waveguide tube elements in the transparent members may be omitted. According to an embodiment, the electronic device 101 may include a virtual reality (VR) device.

Reference to FIG. 2, the first support part 221 and/or the second support part 222 may include printed circuit boards 231-1 and 231-2 for transmitting electrical signals to individual components of the electronic device 101, speakers 232-1 and 232-2 for outputting audio signals, batteries 233-1 and 233-2, and/or hinges 240-1 and 240-2 for at least partial coupling with the body part 223 of the electronic device 101. According to an embodiment, the speakers 232-1 and 232-2 may include a first speaker 232-1 for transmitting an audio signal to the user's left ear and a second speaker 232-2 for transmitting an audio signal to the user's right ear. The speakers 232-1 and 232-2 may be included in the audio module 170 in FIG. 1. According to an embodiment, the electronic device 101 may be equipped with a plurality of batteries 233-1 and 233-2, and may supply power to the printed circuit boards 231-1 and 231-2 through a power management module (e.g., power management module 188 in FIG. 1).

Reference to FIG. 2, the electronic device 101 may include a microphone to receive a voice of the user and an ambient sound. For example, the microphone may be included in the audio module 170 in FIG. 1. The microphone may include a first microphone 241-1 and a second microphone 241-2. The electronic device 101 may include an illuminance sensor 242 for determining ambient brightness. For example, the illuminance sensor 242 may be included in the sensor module 176 in FIG. 1.

According to an embodiment, a virtual object output through the display module 160 may include information related to an application program executed in the electronic device 101 and/or information related to an external object positioned in a real space corresponding to a region (e.g., a visible region) that is determined as the field of view (FoV) of a user. For example, the electronic device 101 may determine, among image information related to a real space, acquired through a camera (e.g., the image-capturing camera 213) of the electronic device 101, an external object (e.g., a subject or a real object) included in at least a part corresponding to the region (e.g., the visible region) that is determined as the field of view (FoV) of the user. The electronic device 101 may output (or display) a virtual object, related to the external object determined in the at least part, through the region (e.g., the visible region or the first display region 311 in FIG. 3), which is determined as the field of view of the user, among the display region of the electronic device 101. The external object may include things existing in the real space. According to various embodiments, the first display region (e.g., the display regions 220-1 and 230-1), in which the electronic device 101 displays a virtual object, may include a part (e.g., at least a part of the display panel) of at least one transparent member (e.g., the first transparent member 220 and the second transparent member 230). According to an embodiment, the first display region (e.g., the display regions 220-1 and 230-1) may be positioned at a part of the first transparent member 220 and/or a part of the second transparent member 230. According to an embodiment, the first display region (e.g., the display regions 220-1 and 230-1) may include a region including a waveguide tube (e.g., an RGB waveguide tube) for displaying a virtual object, and the second display region (e.g., the second display region 312 in FIG. 3) may include a light source module (e.g., the light source module 310 in FIG. 3, or a light source module for emitting infrared rays (e.g., IR light)) for tracking the user's gaze, and/or a waveguide tube (e.g., the waveguide tube 320 in FIG. 3, or an IR waveguide tube) for transferring light, generated from the light source module, to the user's eye.

According to an embodiment, the electronic device 101 may include the image-capturing camera 213 (e.g., an RGB camera) for capturing an image corresponding to the field of view of the user and/or measuring the distance to an object, the eye tracking camera 212 (eye tracking camera) for determining the direction in which the user's eye looks, and/or the recognition cameras 211-1 and 211-2 (e.g., a gesture camera) for recognizing a predetermined space. According to an embodiment, the electronic device 101 may use the image-capturing camera 213 to measure the distance to an object positioned in the front direction (e.g., the direction A) of the user. According to an embodiment, in the electronic device 101, multiple eye tracking cameras 212 corresponding to both eyes of the user may be disposed. The eye tracking camera 212 may sense the direction of the user's gaze (e.g., the movement of an eye). For example, the eye tracking camera 212 may include a first eye tracking camera 212-1 for tracking the direction in which the left eye of the user looks, and a second eye tracking camera 212-2 for tracking the direction in which the right eye of the user looks. According to an embodiment, the electronic device 101 may use the recognition cameras 211-1 and 211-2 to sense the user's gesture within a predetermined distance (e.g., a predetermined space). For example, multiple recognition cameras 211-1 and 211-2 may be provided, and may be disposed on both side surfaces of the electronic device 101. The electronic device 101 may use at least one camera to sense eyes corresponding to a dominant eye and a non-dominant eye. For example, the eyes corresponding to a dominant eye and a non-dominant eye may be sensed based on the direction of the user's gaze on an external object or a virtual object.

According to an embodiment, the photographing camera 213 may include a high quality camera such as a high resolution (HR) camera and/or a photo video (PV) camera. According to an embodiment, the eye tracking camera 212 may track the gaze direction of the user by detecting the user's pupil, and may be used to move the center of a virtual image in response to the gaze direction. For example, the eye tracking camera 212 may be divided into a first eye tracking camera 212-1 corresponding to the left eye and a second eye tracking camera 212-2 corresponding to the right eye, and the cameras may be substantially the same in performance and/or specification. According to an embodiment, the recognition cameras 211-1 and 211-2 may be used for detecting the user's hand (gesture) and/or spatial recognition, and may include a global shutter (GS) camera. For example, the recognition cameras 211-1 and 211-2 may include a GS camera with less image delay like a rolling shutter (RS) camera in order to detect and track a fast hand gesture and/or a minute movement of a finger.

The number and position of one or more cameras (e.g., photographing camera 213, eye tracking camera 212, and/or recognition cameras 211-1 and 211-2) included in the electronic device 101 shown in FIG. 2 may be not fixed. For example, the number and position of one or more cameras (e.g., photographing camera 213, eye tracking camera 212, and/or recognition cameras 211-1 and 211-2) may be variable according to the form (e.g., shape or size) of the electronic device 101.

Figure 3:
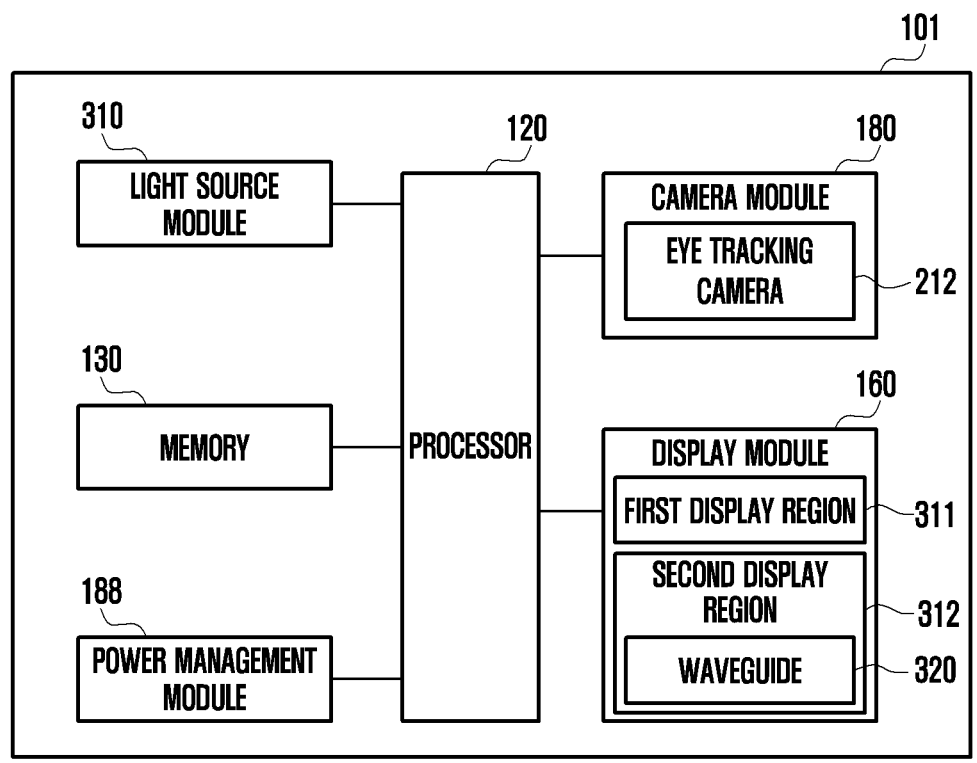
FIG. 3 is a block diagram of an electronic device for tracking a user's gaze according to an embodiment of the disclosure.

FIG. 3 is a block diagram of an electronic device for tracking a user's gaze according to an embodiment of the disclosure.

Referring to FIG. 3, an electronic device 101 may include a processor 120 (e.g., the processor 120 in FIG. 1), a memory 130 (e.g., the memory 130 in FIG. 1), a display module 160 (e.g., the display module 160 in FIG. 1, or the display modules 214-1 and 214-2 in FIG. 2), a camera module 180 (e.g., the camera module 180 in FIG. 1), a power management module 188 (e.g., the power management module 188 in FIG. 1), and/or a light source module 310.

According to an embodiment, the processor 120 may execute a program (e.g., the program 140 in FIG. 1), stored in the memory 130, to control one or more other elements (e.g., hardware or software elements), and to perform various types of data processing or calculation. According to an embodiment, the processor 120 may provide an augmented reality service to a user. The processor 120 may output at least one virtual object through the display module 160 such that the at least one virtual object is shown while being superposed over a real space corresponding to the field of view of the user wearing the electronic device 101.

According to an embodiment, the display module 160 of the electronic device 101 may include at least one transparent member (e.g., a first transparent member (e.g., the first transparent member 220 in FIG. 2) and/or a second transparent member (e.g., the second transparent member 230 in FIG. 2)). According to an embodiment, the display module 160 may be implemented in the form in which at least one layer overlaps. For example, the at least one layer may include at least one among a display panel, a protective panel, and/or a lens. The display panel may be formed as a transparent element such that the user can recognize a real space through the display module 160.

Referring to FIG. 3, a region displayed through the display module 160 may be divided into a first display region 311 and a second display region 312. According to an embodiment, the first display region 311 may include a region (e.g., the display regions 220-1 and 230-1 in FIG. 2) in which at least one virtual object is displayed on at least a part of the display panel such that the virtual object is shown while being superposed over a real space to the user wearing the electronic device 101. According to an embodiment, a waveguide tube (e.g., an RGB waveguide tube) for displaying a virtual object may be at least partially disposed in the first display region 311, and the electronic device 101 may provide a virtual object to the user, based on the first display region 311. According to an embodiment, the second display region 312 may include the remaining region, other than the first display region 311, of the region displayed through the display module 160. According to an embodiment, a waveguide tube 320) (e.g., an IR waveguide tube) for tracking the user's gaze may be at least partially disposed in the second display region 312, and the electronic device 101 may track the user's gaze by using the waveguide tube 320 (e.g., the IR waveguide tube) disposed in the second display region 312.

According to an embodiment, the display module 160 may be divided into the first display region 311 and the second display region 312, and the second display region 312 may include at least one waveguide tube 320 for tracking the user's gaze. For example, a waveguide tube (e.g., an RGB waveguide tube) for displaying a virtual object may be at least partially disposed in the first display region 311 included in the display module 160, and the waveguide tube 320 (e.g., the IR waveguide tube) for tracking the user's gaze may be at least partially disposed in the second display region 312. The waveguide tube 320 may be disposed to correspond to at least one layer of the display module 160. According to an embodiment, the light source module 310 for emitting light (e.g., rays) may be disposed at one end of the waveguide tube 320, and may emit light (e.g., an infrared ray, infrared radiation (IR)) along the waveguide tube 320. According to an embodiment, light emitted from the light source module 310 may be incident on one end of the waveguide tube 320 disposed in the at least one layer, the incident light may be transferred to the user through a waveguide (e.g., waveguide tube) and/or the waveguide tube 320 formed in the transparent member. For example, the waveguide tube 320 may be manufactured using a transparent member, plastic, or a polymer, and may include a nanopattern, formed on one surface of the inside or outside thereof, for example, a polygonal or curved grating structure. According to an embodiment, the incident light may be propagated or reflected inside the waveguide tube 320 by the nanopattern and emitted toward the user's eye (e.g., the pupil). According to an embodiment, the waveguide may include at least one among at least one diffractive element (e.g., a diffractive optical element (DOE) or a holographic optical element (HOE)) or a reflective element (e.g., a reflective mirror). According to an embodiment, the waveguide may use the at least one diffractive element and/or reflective element to guide, to the user's eye, light emitted from the light source module 310. According to an embodiment, when the light source module 310 is disposed at one end of the waveguide tube 320, the light source modules 242-1 and 242-2 illustrated in FIG. 2 may be omitted.

According to an embodiment, the display module 160 may be divided into the first display region 311 and the second display region 312. For example, the first display region 311 may be defined as a region in which an augmented realty service is provided to the user, and may include a waveguide tube (not shown) (e.g., an RGB waveguide tube) for propagating RGB light and providing an object related to an augmented reality service to the user. The second display region 312 may be defined as the remaining display region, other than the first display region 311, of the display region provided to the user through the display module 160, and may include the waveguide tube 320 (e.g., the IR waveguide tube) for propagating IR light and detecting the movement of the user's eye (e.g., a gaze). According to an embodiment, the waveguide tube 320 and/or the waveguide may be implemented based on the second display region 312 of the display module 160. For example, the waveguide tube 320 is a transparent waveguide tube, and at least one pattern structure therein may be at least partially exposed outside. According to an embodiment, the waveguide tube 320 and/or the waveguide is formed based on the second display region 312, and thus may track the movement of the user's eye without covering the first display region 311 in which an object related to an augmented reality service is displayed. According to another embodiment, the first display region 311 and the second display region 312 may be included in the field of view of the user, the first display region 311 may be a region in which a waveguide tube (not shown) for propagating RGB light is at least partially included, and the second display region 312 may be a region in which the waveguide tube 320 for propagating IR light is at least partially included.

According to an embodiment, at least one light source module 310, the waveguide tube 320, and/or the waveguide may be implemented on at least one layer included in the display module 160. For example, the at least one layer may be defined as a layer disposed closest to the user's eye. According to an embodiment, in the electronic device 101, at least one element among the at least one light source module 310, the waveguide tube 320, and/or the waveguide is disposed at a layer most adjacent to the user's eye, and thus the accuracy of tracking the movement of the user's eye can be improved.

According to an embodiment, at least one pattern structure may be implemented in the waveguide tube 320. The at least one pattern structure may at least partially reflect light emitted from the light source module 310. According to an embodiment, the reflected amount may be determined based on the distance by which the at least one pattern structure is away from the light source module 310 and/or the size of the pattern structure. For example, as the pattern structure is positioned farther away from the light source module 310 and/or as the size of the pattern structure is smaller, the amount of light reflected by the pattern structure may be decreased. According to an embodiment, the size of the at least one pattern structure may be determined based on the distance to the light source module 310. For example, a pattern structure positioned close to the light source module 310 may be implemented in a relatively small size, and a pattern structure positioned far away from the light source module 310 may be implemented in a relatively large size. According to an embodiment, the at least one pattern structure may be implemented such that a substantially identical amount of light is guided to the user's eye.

According to an embodiment, the camera module 180 of the electronic device 101 may include an eye tracking camera 212 (e.g., the eye tracking camera modules 212-1 and 212-2 in FIG. 2). According to an embodiment, the eye tracking camera 212 may track the movement of the left eye and/or right eye of the user (e.g., the movement of a pupil). For example, the processor 120 of the electronic device 101 may control light emitted from the light source module 310 to be at least partially reflected through the at least one pattern structure formed in the waveguide tube 320 and the reflected light to be transferred to the user's eye. According to an embodiment, the eye tracking camera 212 may sense light (e.g., infrared rays) transferred to the user's eye, and may track the movement of the user's eye, based on the sensed light.

According to an embodiment, the power management module 188 may manage power supplied to the electronic device 101. According to an embodiment, the power management module 188 may be electrically connected to the elements (e.g., the memory 130, the display module 160, the camera module 180, and/or the light source module 310) of the electronic device 101. For example, the power management module 188 may supply, under control of the processor 120, power to the light source module 310, and may emit, from the light source module 310, light (e.g., infrared rays) for sensing the movement of the user's eye.

According to an embodiment, the electronic device 101 may wirelessly communicate with another electronic device (e.g., the electronic device 102 or 104 in FIG. 1) through a communication module (e.g., the communication module 190 in FIG. 1, a wireless communication circuit). According to an embodiment, the electronic device 101 may exchange instructions and/or data with another external electronic device (e.g., a portable electronic device) through the communication module, and may be at least partially controlled by the other external electronic device. For example, at least one function of the electronic device 101 may perform under control of the other external electronic device.

According to various embodiments, an electronic device (e.g., the electronic device 101) may include a light source module (e.g., the light source module 310), a display module (e.g., the display module 160) including at least one layer, a camera module (e.g., the camera module 180), and a processor (e.g., the processor 120) operatively connected to the light source module 310, the display module 160, and the camera module 180. The processor 120 may emit light through the light source module 310 along a waveguide tube (e.g., the waveguide tube 320) formed in the at least one layer of the display module 160, may use the camera module 180 to detect, based on at least one pattern structure formed in the waveguide tube 320, at least a part of the light, which has been reflected from a user's eyeball, and may track movement of the user's eyeball, based on the detected light.

According to an embodiment, the camera module 180 may include at least one infrared camera, and the processor 120 may use the at least one infrared camera (e.g., the eye tracking camera 212) to detect an infrared ray emitted from the light source module 310.

According to an embodiment, the light source module 310 may be disposed at one end of the display module 160, and may emit an infrared ray along the waveguide tube 320 formed in the display module 160.

According to an embodiment, the waveguide tube 320 may be formed in a layer relatively closest to the user's eyeball among the at least one layer included in the display module 160.

According to an embodiment, the display module 160 may be divided into a first display region (e.g., the first display region 311), in which at least one object related to an augmented reality service is displayed, and a second display region (e.g., the second display region 312), which corresponds to the remaining region of the display region of the display module 160 other than the first display region 311.

According to an embodiment, the waveguide tube 320 may be at least partially formed based on the second display region 312 of the display module 160.

According to an embodiment, the at least one pattern structure may be configured to reflect, toward the user's eyeball, light emitted from the light source module 310.

According to an embodiment, the at least one pattern structure may be formed in a relatively large size as the pattern structure is farther away from the light source module 310, and may be configured such that the reflected amount of the reflected light increases based on the size of the pattern structure.

According to an embodiment, the at least one pattern structure may be configured such that the intensity of the reflected light is determined based on at least one among the type of the pattern structure, the size of the pattern structure, and the interval of the pattern structure.

According to an embodiment, the at least one pattern structure may be implemented such that the intensity of light reflected toward the eyeball is substantially identical.

Figure 4:
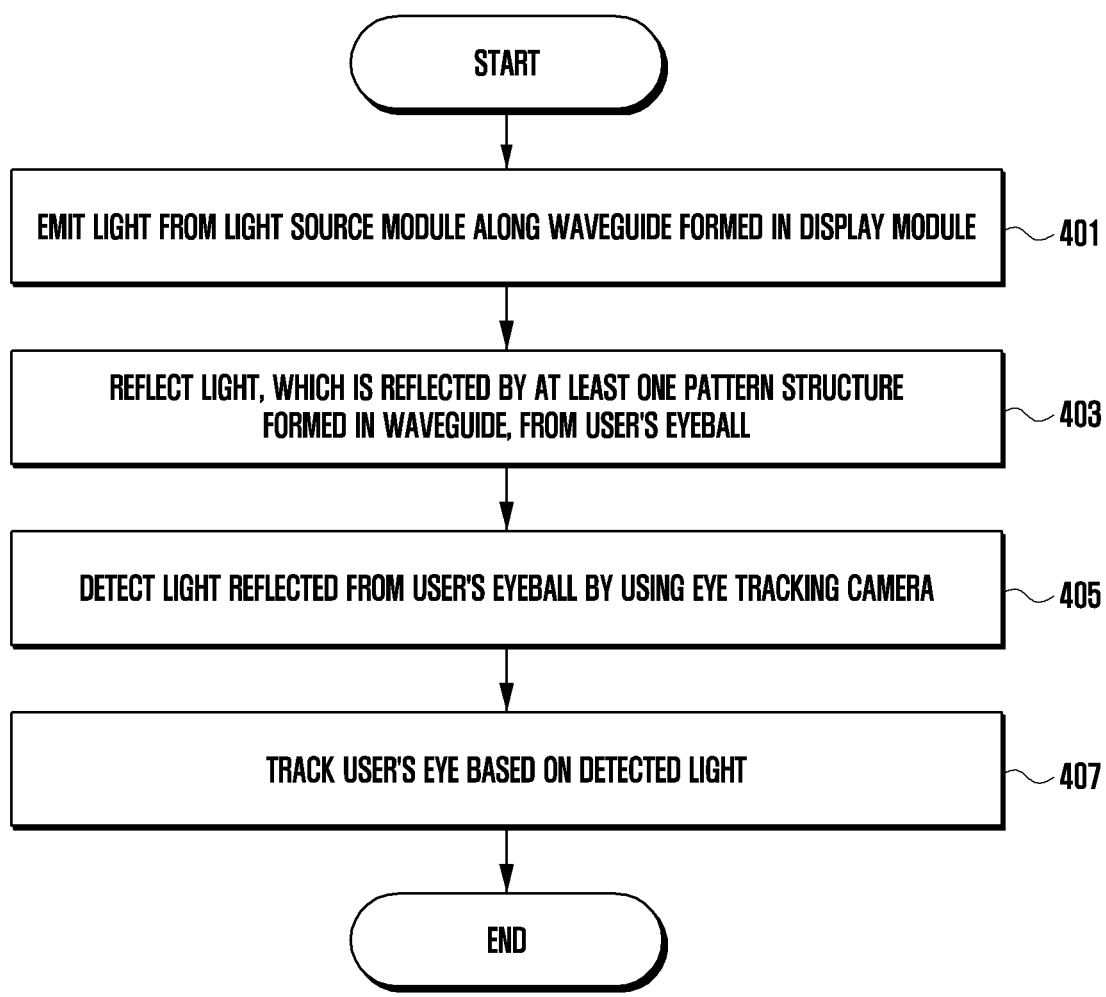
FIG. 4 is a flowchart illustrating a method for tracking a user's gaze through an electronic device according to an embodiment of the disclosure.

FIG. 4 is a flowchart illustrating a method for tracking a user's gaze through an electronic device according to an embodiment of the disclosure. Hereinafter, operations in an embodiment may be sequentially performed, but may not be necessarily sequentially performed. For example, the order of the operations may be changed, and at least two operations may be performed in parallel.

Referring to FIG. 4, an electronic device may include the electronic device 101 in FIG. 1 and/or the electronic device 101 in FIG. 2.

According to an embodiment, an electronic device (e.g., the electronic device 101 in FIG. 1) may include at least one display module (e.g., the display module 160 in FIG. 3) which corresponds to both eyes of the user, respectively. The at least one display module 160 may be divided into a first display region (e.g., the first display region 311 in FIG. 3), in which an augmented reality service is provided, and a second display region (e.g., the second display region 312 in FIG. 3), in which an augmented reality service is not provided. For example, the second display region 312 may be the remaining region of the display region of the display module 160 other than the first display region 311. According to an embodiment, the electronic device 101 may include a light source module (e.g., the light source module 310 in FIG. 3) for tracking the user's gaze, and a waveguide tube (e.g., the waveguide tube 320 in FIG. 3), which is a movement path of light (e.g., an infrared ray) emitted from the light source module 310, may be implemented in the display module 160. According to an embodiment, the waveguide tube 320 may be disposed based on the second display region 312 of the display module 160, and may include at least one pattern structure. For example, the at least one pattern structure may be configured such that light (e.g., an infrared ray) emitted from the light source module 310 is at least partially guided to the user's eye. According to an embodiment, the electronic device 101 may use a camera module (e.g., the camera module 180 in FIG. 3) to sense light (e.g., an infrared ray) reflected from the user's eye, and track the movement of the user's eye (e.g., a gaze direction). According to an embodiment, the display module 160 may be formed of at least one layer, and the waveguide tube 320 may be disposed based on a layer closest to the user's eye. According to an embodiment, since the waveguide tube 320 is disposed based on a layer closest to an eye, the electronic device 101 may more accurately track the movement of the eye.

In operation 401, a processor (e.g., the processor 120 in FIG. 3) of the electronic device 101 may control light (e.g., a ray or an infrared ray) to be emitted from the light source module 310 along the waveguide tube 320 formed in the display module 160. For example, the display module 160 may be divided into the first display region 311 (e.g., a region in which an augmented reality service is provided) and/or the second display region 312 (e.g., the remaining region other than the first display region 311, or a region in which an augmented reality service is not provided), and the waveguide tube 320 may be disposed based on the second display region 312. According to an embodiment, the display module 160 may be configured in a form in which the at least one layer is laminated, and the at least one layer may include a display panel (e.g., an RGB panel), a protective panel, and/or a lens. According to an embodiment, the waveguide tube 320 may be disposed in a layer most adjacent to the user's eye among the at least one layer. For example, the waveguide tube 320 may be configured to be disposed in at least one of the display panel and the protective panel.

In operation 403, the light emitted from the light source module 310 included in the display module 160 may be reflected by at least one pattern structure formed in the waveguide tube 320, and light incident on a user's eyeball (e.g., eye) may be reflected from the user's eyeball. According to an embodiment, the at least one pattern structure may be implemented in the waveguide tube 320, and the at least one pattern structure may be configured such that light is guided to the user's eye. For example, light emitted from the light source module 310 may be at least partially reflected by the at least one pattern structure of the waveguide tube 320 while being transferred along the waveguide tube 320. The reflected light may be guided in a direction in which the user's eye is positioned. According to an embodiment, the at least one pattern structure may be configured such that a pattern size increases as the pattern structure is farther away from the light source module 310. For example, the amount of light reflected may increase as the pattern size increases. The intensity of light emitted from the light source module 310 may decrease as the distance from the light source module 310 increases. According to an embodiment, the electronic device 101 may differently implement the size of the at least one pattern structure such that the intensity of light guided to the user's eye is constant. According to an embodiment, the intensity of light guided to the user's eye may remain constant, and the electronic device 101 may more accurately track the movement of the user's eye.

In operation 405, the processor 120 may use an eye tracking camera (e.g., the eye tracking camera 212 in FIG. 3) to detect the light (e.g., a ray) reflected by the user's eyeball. For example, the eye tracking camera 212 may include an infrared camera for detecting infrared radiation. According to an embodiment, the light reflected by the user's eyeball may include infrared radiation, and the electronic device 101 may detect the reflected light by using the eye tracking camera 212 which corresponds to the infrared camera.

In operation 407, the processor 120 may track the user's gaze (the movement of the user's eye), based on the detected light. According to an embodiment, the electronic device 101 may include at least one light source module 310. Accuracy of gaze tracking may increase as the number of the light source module 310 increases.

According to an embodiment, the processor 120 may use an eye tracking camera (e.g., the eye tracking camera 212 in FIG. 3) to change, based on the detected direction of the user's gaze, display of a virtual object or receive the same as an input of the virtual object. For example, the processor 120 may move the center of a virtual image including a virtual object in response to the gaze direction. In another example, when the direction of the user's gaze is located in a designated position for a designated time, the processor 120 may process, based on the direction of the user's gaze, the direction of the user's gaze as an input of a virtual object displayed in the designated position.

Figure 5:
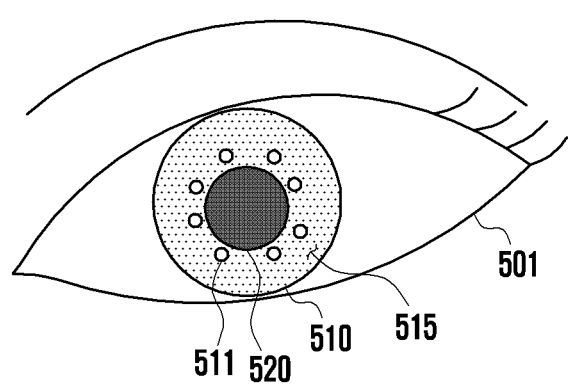
FIG. 5 is an illustration of the structure of a user's eye according to an embodiment of the disclosure.

FIG. 5 is an illustration of the structure of a user's eye according to an embodiment of the disclosure.

Referring to FIG. 5, an eye 501 (e.g., an eyeball) of a user may be divided into a cornea 510 and/or a pupil 520. For example, the cornea 510 is positioned on the outermost surface of an eyeball, and is a portion through which reflected light passes first. The cornea 510 is always exposed to an outside environment, and may have a shape for at least partially covering the pupil 520. The pupil 520 may adjust the amount of light introduced into the eyeball. For example, in the process in which light passes through the cornea 510 and is then introduced into an iris through the pupil 520, the pupil 520 may adjust the amount of light introduced. Referring to FIG. 5, a region positioned between the outer-circumferential boundary of the pupil 520 and the outer-circumferential boundary of the cornea 510 may be configured as a first region 515, and light emitted from a light source module (e.g., the light source module 310 in FIG. 3) of an electronic device (e.g., the electronic device 101 in FIG. 1) may be introduced to the first region 515. Referring to FIG. 5, an infrared reflected ray 511 reflected from the first region 515 is illustrated.

According to an embodiment, the electronic device 101 may implement at least one pattern structure in a waveguide tube (e.g., the waveguide tube 320 in FIG. 3) such that light emitted from the light source module 310 travels toward the user's eye (e.g., the first region 515). According to an embodiment, the reflected light may be reflected again from the first region 515 through the at least one pattern structure. According to an embodiment, the electronic device 101 may use a camera module (e.g., the camera module 180 in FIG. 3) to detect the infrared reflected ray 511 reflected from the first region 515. According to an embodiment, the electronic device 101 may track the movement of the user's eye, based on the detected infrared reflected ray 511. For example, the electronic device 101 may make at least one light source of the light source module 310 emit light in a designated pattern or order, and may thus track the movement of the user's eye, based on the position of the infrared reflected ray 511 and movement of the position thereof.

Figure 6A:
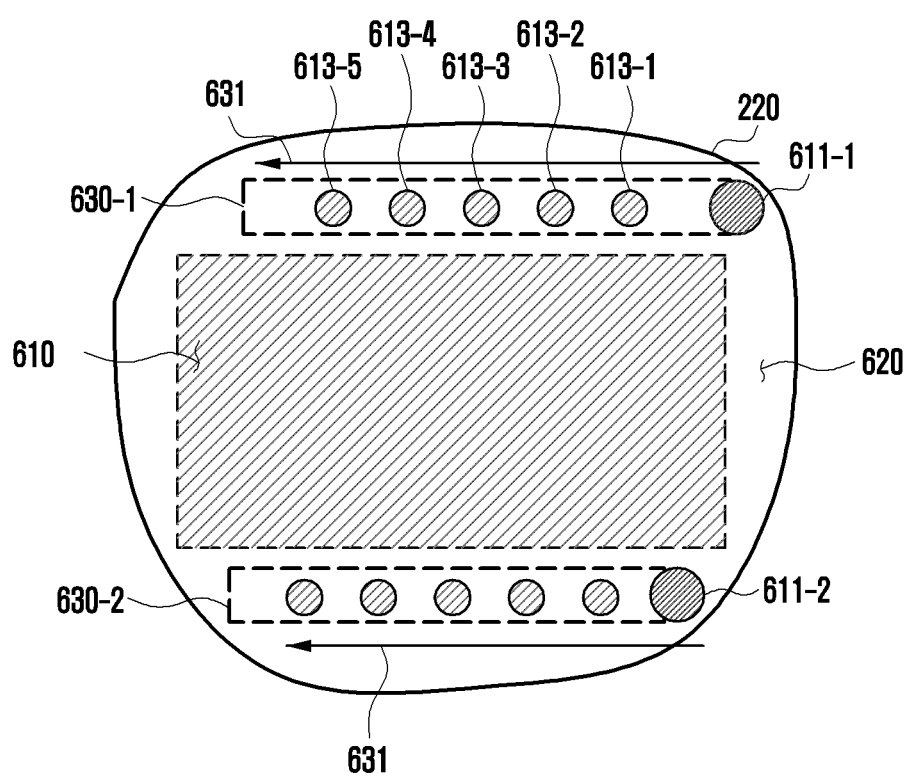
FIG. 6A is an illustration of a waveguide tube formed in a display module according to an embodiment of the disclosure.
Figure 6B:
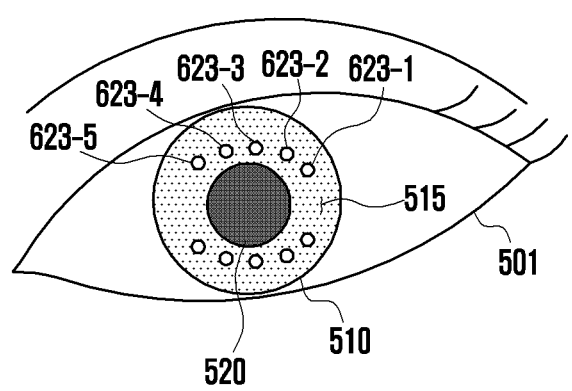
FIG. 6B is an illustration of a situation in which light emitted along a waveguide tube is reflected by an eye according to an embodiment of the disclosure.

FIG. 6A is an illustration of a waveguide tube formed in a display module according to an embodiment of the disclosure. FIG. 6B is an illustration of a situation in which light emitted along a waveguide tube is reflected by an eye according to an embodiment of the disclosure. FIG. 6A illustrates a first transparent member (e.g., the first transparent member 220 in FIG. 2) included in a display module (e.g., the display module 160 in FIG. 1) of an electronic device (e.g., the electronic device 101 in FIG. 1), and FIG. 6B illustrates a user's eye 501.

Referring to FIG. 6A, the first transparent member 220 may be divided into a first display region 610 and a second display region 620. For example, the first display region 610 may be defined as a region in which an augmented reality service is provided, and may include a waveguide tube for propagating RGB light and providing an object related to an augmented reality service to the user. The second display region 620 may be defined as the remaining region of the display region of the first transparent member 220 other than the first display region 610, and may include waveguide tubes 630-1 and 630-2 for propagating IR light and detecting the movement of the user's eye.

According to an embodiment, the electronic device 101 may use light (e.g., an infrared ray, IR light) to detect the movement of the user's eye, and may include at least one light source module (e.g., the light source module 310 in FIG. 3, a first light source module 611-1, and/or a second light source module 611-2) for emitting the light. According to an embodiment, the first light source module 611-1 may emit light along a first waveguide tube 630-1 (e.g., the waveguide tube 320 in FIG. 3), and the second light source module 611-2 may emit light along a second waveguide tube 630-2 (e.g., the waveguide tube 320 in FIG. 3). For example, the first light source module 611-1 may be disposed at one end of the first waveguide tube 630-1, and may introduce light into the one end of the first waveguide tube 630-1. Light emitted from the first light source module 611-1 may be transmitted in a first direction 631 along the first waveguide tube 630-1. According to an embodiment, the waveguide tubes may include at least one pattern structure, and may at least partially reflect the introduced light, based on the at least one pattern structure. For example, the first waveguide tube 630-1 may include at least one pattern structure 613-1, 613-2, 613-3, 613-4, or 613-5. The electronic device 101 may be configured such that light emitted from the first light source module 611-1 is reflected by the at least one pattern structure implemented in the first waveguide tube 630-1 and travels toward the user's eyeball. According to an embodiment, the electronic device 101 may be configured such that light emitted from the second light source module 611-2 is reflected by at least one pattern structure implemented in the second waveguide tube 630-2 and travels toward the user's eyeball. According to an embodiment, the at least one light source module 310 may be disposed at one end of at least one waveguide tube 320 (e.g., the first waveguide tube 630-1 or the second waveguide tube 630-2), and may be operatively connected to a processor (e.g., the processor 120 in FIG. 3) so as to be at least partially controlled by the processor 120. For example, the at least one light source module 310 may be positioned adjacent to a frame (e.g., the body part 223 in FIG. 2) to be operatively or electrically connected to the processor 120, or may be operatively or electrically connected to the processor 120 through a transparent electrode positioned in the first transparent member (e.g., the first transparent member 220 in FIG. 2).

According to an embodiment, the first waveguide tube 630-1 and/or the second waveguide tube 630-2 may be at least partially disposed in the second display region 620 of the first transparent member 220. The at least one pattern structure, implemented in the first waveguide tube 630-1 and/or the second waveguide tube 630-2, may be configured such that introduced light at least partially travels toward the user's eyeball.

Referring to FIG. 6B, light reflected by the at least one pattern structure may be transferred to the user's eye 501, and may be reflected again. For example, the user's eye 501 (e.g., an eyeball) may be divided into a cornea 510 and/or a pupil 520. Referring to FIG. 6B, a region between the outer-circumferential boundary of the pupil 520 and the outer-circumferential boundary of the cornea 510 may be configured as a first region 515, and the light reflected by the at least one pattern structure may be reflected again from the first region 515. Referring to FIG. 6B, an illustration is made of at least one infrared reflected ray 623-1, 623-2, 623-3, 623-4, or 623-5 when light reflected by the at least one pattern structure 613-1, 613-2, 613-3, 613-4, or 613-5 is reflected again, based on the first region 515. For example, light reflected by a first pattern structure 613-1 may be reflected again as a first infrared reflected ray 623-1 in the first region 515.

According to an embodiment, the electronic device 101 may use a camera module (e.g., the camera module 180 in FIG. 3) to detect the at least one infrared reflected ray 623-1, 623-2, 623-3, 623-4, or 623-5, and may track the movement of the user's eye, based on the detected infrared reflected ray.

Figure 7A:
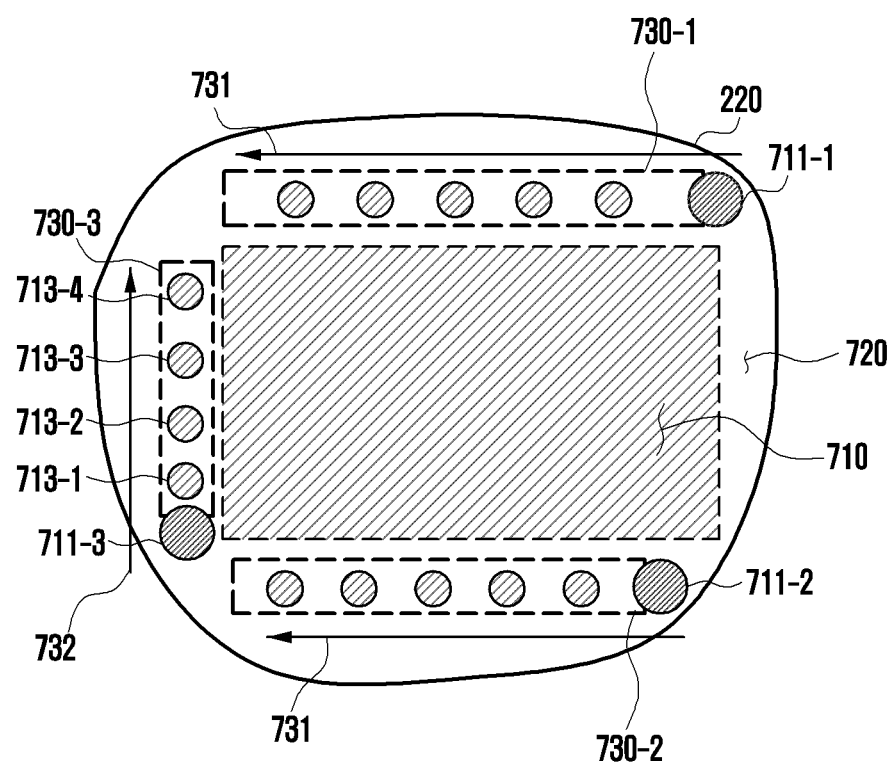
FIG. 7A is another illustration of a waveguide tube formed in a display module according to an embodiment of the disclosure.
Figure 7B:
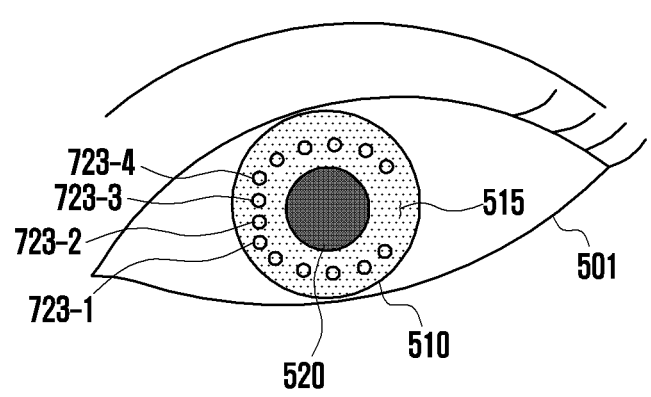
FIG. 7B is another illustration of a situation in which light emitted along a waveguide tube is reflected by an eye according to an embodiment of the disclosure.

FIG. 7A is another illustration of a waveguide tube formed in a display module according to an embodiment of the disclosure. FIG. 7B is another illustration of a situation in which light emitted along a waveguide tube is reflected by an eye according to an embodiment of the disclosure. FIG. 7A illustrates a first transparent member (e.g., the first transparent member 220 in FIG. 2) included in a display module (e.g., the display module 160 in FIG. 1) of an electronic device (e.g., the electronic device 101 in FIG. 1), and FIG. 7B illustrates a user's eye 501.

Referring to FIG. 7A, the first transparent member 220 may be divided into a first display region 710 and a second display region 720. For example, the first display region 710 may be defined as a region in which an augmented reality service is provided, and may include a waveguide tube for propagating RGB light and providing an object related to an augmented reality service to the user. The second display region 720 may be defined as the remaining region of the display region of the first transparent member 220 other than the first display region 710, and may include waveguide tubes 730-1, 730-2, and 730-3 for propagating IR light and detecting the movement of the user's eye.

Referring to FIG. 7A, the electronic device 101 may include multiple light source modules (e.g., the light source module 310 in FIG. 3, a first light source module 711-1, a second light source module 711-2, and/or a third light source module 711-3). According to an embodiment, the first light source module 711-1 may emit light in a first direction 731 along a first waveguide tube 730-1 (e.g., the waveguide tube 320 in FIG. 3), the second light source module 711-2 may emit light in the first direction 731 along a second waveguide tube 730-2, and the third light source module 711-3 may emit light in a second direction 732 along a third waveguide tube 730-3.

According to an embodiment, the first waveguide tube 730-1 the second waveguide tube 730-2, and/or the third waveguide tube 730-3 may be at least partially disposed in the second display region 720 of the first transparent member 220. At least one pattern structure, implemented in the first waveguide tube 730-1, the second waveguide tube 730-2, and/or the third waveguide tube 730-3, may be configured such that introduced light at least partially travels toward the user's eyeball. For example, reflected light may be transferred to the user's eyeball based on at least one pattern structure 713-1, 713-2, 713-3, or 713-4, implemented in the third waveguide tube 730-3.

According to an embodiment, the first waveguide tube 730-1, the second waveguide tube 730-2, and/or the third waveguide tube 730-3 may be positioned at the outer peripheral part of the first display member 220. For example, the waveguide tubes may be positioned adjacent to a frame (e.g., the body part 223 in FIG. 2) in which the first display member 220 and the second display member 230 are positioned.

Referring to FIG. 7B, light reflected by the at least one pattern structure may be transferred to the user's eye 501, and may be reflected again. For example, the user's eye 501 (e.g., an eyeball) may be divided into a cornea 510 and/or a pupil 520. Referring to FIG. 7B, a region positioned between the outer-circumferential boundary of the pupil 520 and the outer-circumferential boundary of the cornea 510 may be configured as a first region 515, and light reflected by the at least one pattern structure may be reflected again by the first region 515. Referring to FIG. 7B, an illustration is made of at least one infrared reflected ray 723-1, 723-2, 723-3, or 723-4 when the light reflected by the at least one pattern structure 713-1, 713-2, 713-3, or 713-4 is reflected again based on the first region 515. For example, light reflected by a first pattern structure 713-1 may be reflected again as a first infrared reflected ray 723-1 in the first region 515.

According to an embodiment, the electronic device 101 may use a camera module (e.g., the camera module 180 in FIG. 3) to detect the at least one infrared reflected ray 723-1, 723-2, 723-3, or 723-4, and may track the movement of the user's eye, based on the detected infrared reflected ray.

According to an embodiment, the accuracy of tracking the movement of an eye may be improved as the number of pattern structures formed in the waveguide tubes increases. According to an embodiment, the electronic device 101 may determine the types of pattern structures, the number of pattern structures, an interval between pattern structures, and/or the number of the light source modules 310 such that the accuracy of tracking the movement of the user's eye is improved. For example, the accuracy of tracking the movement of the user's eye may be improved as the number of pattern structures and/or the light source modules 310 increases.

Figure 8A:
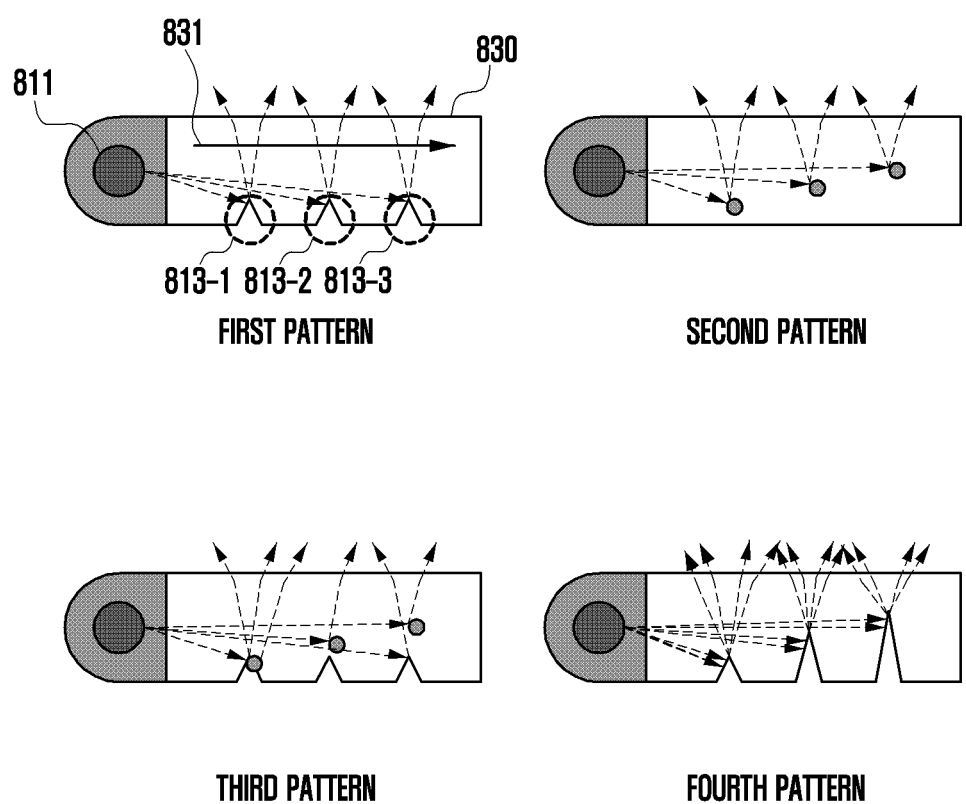
FIG. 8A is an illustration of a process in which light is reflected based on a pattern formed in a waveguide tube according to an embodiment of the disclosure.

FIG. 8A is an illustration of a process in which light is reflected based on a pattern formed in a waveguide tube according to an embodiment of the disclosure.

According to an embodiment, at least one pattern structure may be implemented in a waveguide tube 830 (e.g., the waveguide tube 320 in FIG. 3). Referring to FIG. 8A, a light source module 811 (e.g., the light source module 310 in FIG. 3) may emit light in a first direction 831 along the waveguide tube 830. The at least one pattern structure may be configured such that the light emitted from the light source module 811 is at least partially reflected toward a user's eye.

Referring to FIG. 8A, four types of patterns (e.g., a first pattern, a second pattern, a third pattern, and a fourth pattern), which can be included in the at least one pattern structure, are illustrated. The at least one pattern structure is not limited to the patterns illustrated in FIG. 8A, and may be designed in various forms. For example, the at least one pattern structure may include at least one among a protruding structure, a hole structure, and/or a concave structure. For example, the first pattern may include at least one protruding pattern structure 813-1, 813-2, or 813-3, and the second pattern may include at least one hole structure. For example, the size of the hole structure of the second pattern may be determined based on the distance between the hole structure and the light source module 811, and the size of the hole structure may increase as the distance increases. The third pattern may be formed by mixing at least one protruding pattern structure and at least one hole structure. The fourth pattern may include protruding pattern structures having different sizes. According to an embodiment, the size and shape of the at least one pattern structure (e.g., the first pattern, the second pattern, the third pattern, and/or the fourth pattern) may be determined such that light emitted from the light source module 811 can be reflected in a substantially identical intensity.

According to an embodiment, the intensity of emitted light may decrease as the distance from the light source module 811 increases. For example, in the first pattern, the intensity of light transferred to a first protruding pattern structure 813-1 may be stronger than the intensity of light transferred to a third protruding pattern structure 813-3. According to an embodiment, the electronic device 101 may adjust the size of the at least one pattern structure such that light reflected by the at least one pattern structure has a substantially identical intensity. For example, the larger the pattern structure is, the more the reflected amount may be, and the stronger the intensity of reflected light may be. According to an embodiment, the size of at least one pattern structure may decrease as the distance from the light source module 811 increases. According to an embodiment, in the electronic device 101, the at least one pattern structure may be configured to have different sizes such that the intensity of light reflected by the at least one pattern structure is substantially identical. For example, a pattern structure (e.g., the first protruding pattern structure 813-1) positioned close to the light source module 811 may be configured to have a relatively small size, and a pattern structure (e.g., the third protruding pattern structure 813-3) positioned distant from the light source module 811 may be configured to have a relatively large size.

Figure 8B:
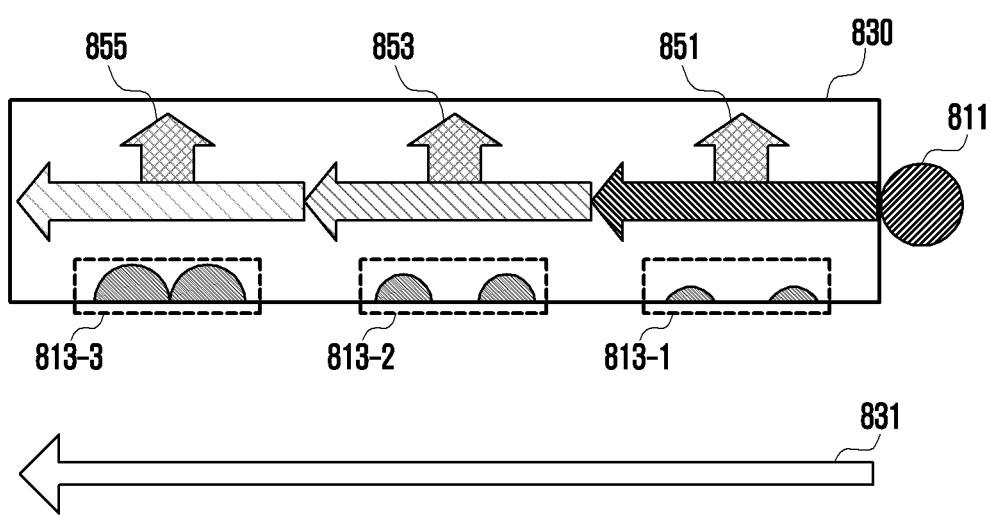
FIG. 8B is an illustration in which the sizes of patterns are differently formed depending on the distance from a light source according to an embodiment of the disclosure.

FIG. 8B is an illustration in which the sizes of patterns are differently formed depending on the distance from a light source according to an embodiment of the disclosure.

According to an embodiment, the intensity of light emitted from a light source module 811 (e.g., the light source module 310 in FIG. 3) may decrease as the distance from the light source module 811 increases. Referring to FIG. 8B, the light source module 811 may be disposed at one end of a waveguide tube 830 (e.g., the waveguide tube 320 in FIG. 3), and at least one pattern structure (e.g., a first pattern structure 813-1, a second pattern structure 813-2, and/or a third pattern structure 813-3) may be disposed in the waveguide tube 830. Referring to FIG. 8B, light emitted from the light source module 811 may be transferred in a first direction 831 along the waveguide tube 830, and may be at least partially reflected by the at least one pattern structure. According to an embodiment, the amount of light reflected by the at least one pattern structure may be determined based on the size thereof. For example, the amount of light reflected may increase as the size of a pattern structure increases. Referring to FIG. 8B, the at least one pattern structure (e.g., the first pattern structure 813-1, the second pattern structure 813-2, and/or the third pattern structure 813-3) may be configured to have different sizes such that reflected rays 851, 853, and 855 of the light have a substantially identical intensity.

Referring to FIG. 8B, the first pattern structure 813-1 positioned closest to the light source module 811 may be configured to have a relatively smallest size, the third pattern structure 813-3 positioned farthest away from the light source module 811 may be configured to have a relatively largest size. According to an embodiment, the electronic device 101 may adjust the size of the at least one pattern structure such that light reflected by the at least one pattern structure has a substantially identical intensity.

Figure 9A:
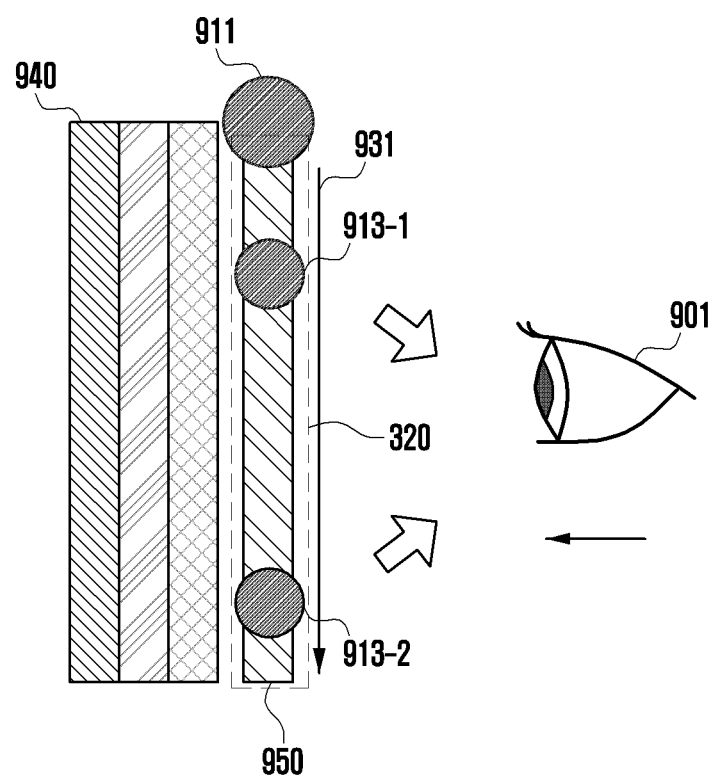
FIG. 9A is a first illustration in which a waveguide tube is formed in a layer closest to a user's eye in a display module according to an embodiment of the disclosure.

FIG. 9A is a first illustration in which a waveguide tube is formed on a layer closest to a user's eye in a display module according to an embodiment of the disclosure.

According to an embodiment, an electronic device (e.g., the electronic device 101 in FIG. 1) may include a display module (e.g., the display module 160 in FIG. 1) including at least one waveguide tube (e.g., the waveguide tube 320 in FIG. 3). The display module 160 may be designed in a form in which at least one layer is laminated, and the at least one layer may include a display panel and/or a protective panel. According to an embodiment, in order to improve the accuracy of tracking the movement of a user's eye, the waveguide tube 320 may be disposed in a layer closest to the user's eye.

Referring to FIG. 9A, the display module 160 may include a display panel 940 and/or a protective panel 950. For example, the display panel 940 may be divided into RGB panels (e.g., red, green, blue). The display module 160 may be implemented in a form in which the display panel 940 and the protective panel 950 are laminated. Referring to FIG. 9A, the protective panel 950 of the display module 160 may be disposed relatively closest to an eyeball 901 of the user, and a light source module 911 (e.g., the light source module 310 in FIG. 3) may be disposed at one end of the protective panel 950. A waveguide tube 320 may be at least partially formed in the protective panel 950. For example, light emitted from the light source module 911 may be reflected by at least one pattern 913-1 or 913-2 form in the waveguide tube 320, and the reflected light may be transferred to the user's eyeball. Light emitted from the light source module 911 may be transferred in a first direction 931 along the waveguide tube 320, and may be at least partially reflected by the at least one pattern structure.

According to an embodiment, the light source module 911 and/or the waveguide tube 320 may be disposed in a layer positioned relatively closest to the user's eyeball. Light is reflected through the waveguide tube 320 positioned relatively closest to the user's eyeball, and thus the accuracy of tracking the movement of the user's eyeball may be improved.

Figure 9B:
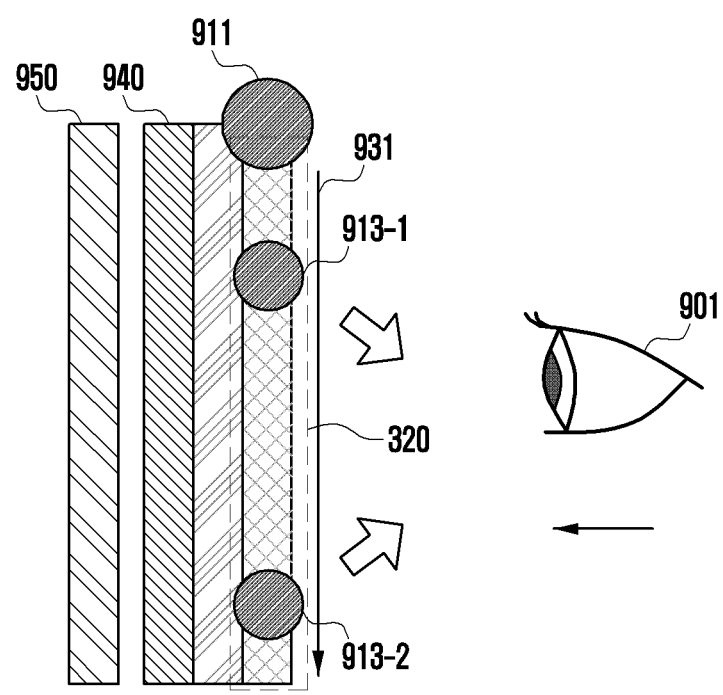
FIG. 9B is a second illustration in which a waveguide tube is formed in a layer closest to a user's eye in a display module according to an embodiment of the disclosure.

FIG. 9B is a second illustration in which a waveguide tube is formed on a layer closest to a user's eye in a display module according to an embodiment of the disclosure.

Referring to FIG. 9B, the display module 160 may include a display panel 940 and/or a protective panel 950. For example, the display panel 940 may be divided into RGB panels (e.g., red, green, blue). The display module 160 may be implemented in a form in which the display panel 940 and the protective panel 950 are laminated. Referring to FIG. 9B, the display panel 940 of the display module 160 may be disposed relatively closest to an eyeball 901 of the user, and a light source module 911 (e.g., the light source module 310 in FIG. 3) may be disposed at one end of a layer included in the display panel 940. A waveguide tube 320 may be at least partially formed in the layer included in the display panel 940. For example, light emitted from the light source module 911 may be reflected by at least one pattern 913-1 or 913-2 formed in the waveguide tube 320, and the reflected light may be transferred to the user's eyeball.

According to an embodiment, the light source module 911 and/or the waveguide tube 320 may be disposed at a layer (e.g., red of RGB panels) positioned relatively closest to the user's eyeball. Light is reflected through the waveguide tube 320 positioned relatively closest to the user's eyeball, and thus the accuracy of tracking the movement of the user's eyeball may be improved.

A method for tracking a gaze by an electronic device (e.g., the electronic device 101) according to various embodiments may include an operation of controlling a light source module (e.g., the light source module 310) such that light is emitted through the light source module 310 along a waveguide tube (e.g., the waveguide tube 320) formed in at least one layer included in a display module (e.g., the display module 160), an operation of using a camera module (e.g., the camera module 180) to detect, based on at least one pattern structure formed in the waveguide tube 320, at least a part of the emitted light, which has been reflected from a user's eyeball, and an operation of tracking movement of the user's eyeball, based on the detected light.

According to an embodiment, the camera module 180 may include at least one infrared camera, and the operation of detecting the light reflected from the user's eyeball may include an operation of detecting an infrared ray included in the emitted light by using the at least one infrared camera (e.g., the eye tracking camera 212).

The light source module 310 according to an embodiment may be disposed at one end of the display module 160, and may emit an infrared ray along the waveguide tube formed in the display module 160.

According to an embodiment, the waveguide tube 320 may be formed in a layer relatively closest to the user's eyeball among the at least one layer included in the display module 160.

According to an embodiment, the display module 160 may be divided into a first display region (e.g., the first display region 311), in which at least one object related to an augmented reality service is displayed, and a second display region (e.g., the second display region 312), which corresponds to the remaining region of the display region of the display module 160 other than the first display region 311.

According to an embodiment, the waveguide tube 320 may be at least partially formed based on the second display region 312 of the display module 160.

According to an embodiment, the at least one pattern structure may reflect, toward the user's eyeball, light emitted from the light source module 310.

According to an embodiment, the at least one pattern structure may be formed in a relatively large size as the pattern structure is farther away from the light source module 310, and the reflected amount of the reflected light increases based on the size of the pattern structure.

According to an embodiment, in the at least one pattern structure, the intensity of the reflected light may be determined based on at least one among the type of the pattern structure, the size of the pattern structure, and the interval of the pattern structure.

According to an embodiment, the at least one pattern structure may be implemented such that the intensity of light reflected toward the eyeball is substantially constant.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a light source module;
a display module comprising at least one layer and being divided into a first display region, in which at least one object related to an augmented reality service is displayed, and a second display region, which corresponds to a remaining region of a display region of the display module other than the first display region;
a camera module; and
a processor operatively connected to the light source module, the display module, and the camera module,
wherein the processor is configured to:
control the light source module to emit light along a waveguide formed in the at least one layer of the display module,
use the camera module to detect, based on at least one pattern structure formed in the waveguide, at least a part of the light, which has been reflected from a user's pupil, and
track movement of the user's pupil, based on the detected light, and
wherein the waveguide is at least partially formed based on the second display region of the display module.

2. The electronic device of claim 1,
wherein the camera module comprises at least one infrared camera, and
wherein the processor is configured to use the at least one infrared camera to detect an infrared ray emitted from the light source module.

3. The electronic device of claim 1,
wherein the light source module is disposed at one end of the display module, and
wherein the light source module is configured to emit an infrared ray along the waveguide formed in the display module.

4. The electronic device of claim 1, wherein the waveguide is formed in a layer disposed closest to the user's pupil among the at least one layer included in the display module.

5. The electronic device of claim 1,
wherein the at least one pattern structure is configured to reflect, toward the user's pupil, light emitted from the light source module, and
wherein the at least one pattern structure is configured such that an intensity of light reflected toward the pupil from along the waveguide is substantially constant.

6. The electronic device of claim 1,
wherein the at least one pattern structure is formed in a progressively larger size as the pattern structure is located farther away from the light source module, and
wherein the at least one pattern structure is configured such that an amount of the reflected light increases based on the size of the pattern structure.

7. The electronic device of claim 1, wherein the at least one pattern structure is configured such that an intensity of the reflected light is determined based on at least one among a type of the pattern structure, a size of the pattern structure, or an interval of the pattern structure.

8. The electronic device of claim 1, wherein the waveguide comprises a waveguide tube disposed in a vicinity of a periphery of the display module.

9. The electronic device of claim 1, wherein the at least one pattern structure comprises one of:
 a first pattern comprising at least one protruding pattern structure,
 a second pattern comprising at least one hole structure,
 a third pattern comprising a mix of at least one protruding pattern structure and at least one hole structure, or
 a fourth pattern comprising protruding pattern structures having different sizes.

10. The electronic device of claim 9,
 wherein a size of the at least one hole structure of the second pattern is determined based on a distance between the at least one hole structure and the light source module, and
 wherein the size of the at least one hole structure increases as the distance increases.

11. The electronic device of claim 9, further comprising a protective panel laminated on a surface of the display module.

12. The electronic device of claim 1,
 wherein the electronic device is in a form of eyeglasses or goggles, and
 wherein the display module comprises a first transparent member corresponding to a left eye and a second transparent member corresponding to a right eye.

13. A method for tracking a gaze by an electronic device, the method comprising:
 controlling a light source module to emit light through the light source module along a waveguide formed in at least one layer included in a display module;
 using a camera module to detect, based on at least one pattern structure formed in the waveguide, at least a part of the emitted light, which has been reflected from a user's pupil; and
 tracking movement of the user's pupil, based on the detected light,
 wherein the display module is divided into a first display region, in which at least one object related to an augmented reality service is displayed, and a second display region, which corresponds to a remaining region of a display region of the display module other than the first display region, and
 wherein the waveguide is at least partially formed based on the second display region of the display module.

14. The method of claim 13,
 wherein the camera module comprises at least one infrared camera, and
 wherein the detecting of the light reflected from the user's pupil comprises detecting an infrared ray included in the emitted light by using the at least one infrared camera.

15. The method of claim 13, wherein the waveguide is formed in a layer disposed closest to the user's pupil among the at least one layer included in the display module.

16. The method of claim 13,
 wherein the at least one pattern structure reflects, toward the user's pupil, light emitted from the light source module, and
 wherein the at least one pattern structure is configured such that an intensity of light reflected toward the pupil from along the waveguide is substantially constant.

17. The method of claim 13,
 wherein the at least one pattern structure is formed in a progressively larger size as the pattern structure is located farther away from the light source module, and
 wherein the at least one pattern structure is configured such that an amount of the reflected light increases based on the size of the pattern structure.

18. The method of claim 13, wherein an intensity of the reflected light is determined based on at least one among a type of the pattern structure, a size of the pattern structure, or an interval of the pattern structure.

* * * * *